(12) United States Patent
Roettger et al.

(10) Patent No.: US 8,170,969 B2
(45) Date of Patent: May 1, 2012

(54) AUTOMATED COMPUTATION OF SEMANTIC SIMILARITY OF PAIRS OF NAMED ENTITY PHRASES USING ELECTRONIC DOCUMENT CORPORA AS BACKGROUND KNOWLEDGE

(75) Inventors: Hans Roettger, Munich (DE); Cai-Nicolas Ziegler, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 852 days.

(21) Appl. No.: 12/246,894

(22) Filed: Oct. 7, 2008

(65) Prior Publication Data
US 2010/0042576 A1 Feb. 18, 2010

(30) Foreign Application Priority Data
Aug. 13, 2008 (EP) .................................... 08014457

(51) Int. Cl.
*G06F 17/00* (2006.01)
(52) U.S. Cl. ........................................................ 706/45
(58) Field of Classification Search ............... 706/12, 706/45
See application file for complete search history.

(56) References Cited

U.S. PATENT DOCUMENTS

| | | | |
|---|---|---|---|
| 2005/0108001 A1* | 5/2005 | Aarskog | 704/10 |
| 2006/0036596 A1* | 2/2006 | Zhang et al. | 707/5 |
| 2007/0156622 A1* | 7/2007 | Akkiraju et al. | 706/48 |
| 2008/0319735 A1* | 12/2008 | Kambhatla et al. | 704/9 |
| 2009/0164895 A1* | 6/2009 | Baeza-Yates et al. | 715/700 |

* cited by examiner

*Primary Examiner* — David Vincent
(74) *Attorney, Agent, or Firm* — Staas & Halsey LLP

(57) ABSTRACT

An overall semantic similarity score value between pairs of named entities in a text corpus is obtained by calculating for at least one pair of named entities a plurality of corresponding pair similarity score values according to a first and at least a second classifier using electronic information sources. Each pair similarity score value of the pair of named entities per classifier is normalized by calculating a rank list per classifier, for example, for each named entity. The rank list holds each pair of named entities of the text corpus, wherein a rank of each pair of named entities within the rank list reflects the respective pair similarity score value. Further an arithmetic mean of the normalized pair similarity score value of each pair of named entities is calculated to provide the overall semantic similarity score value.

23 Claims, 11 Drawing Sheets

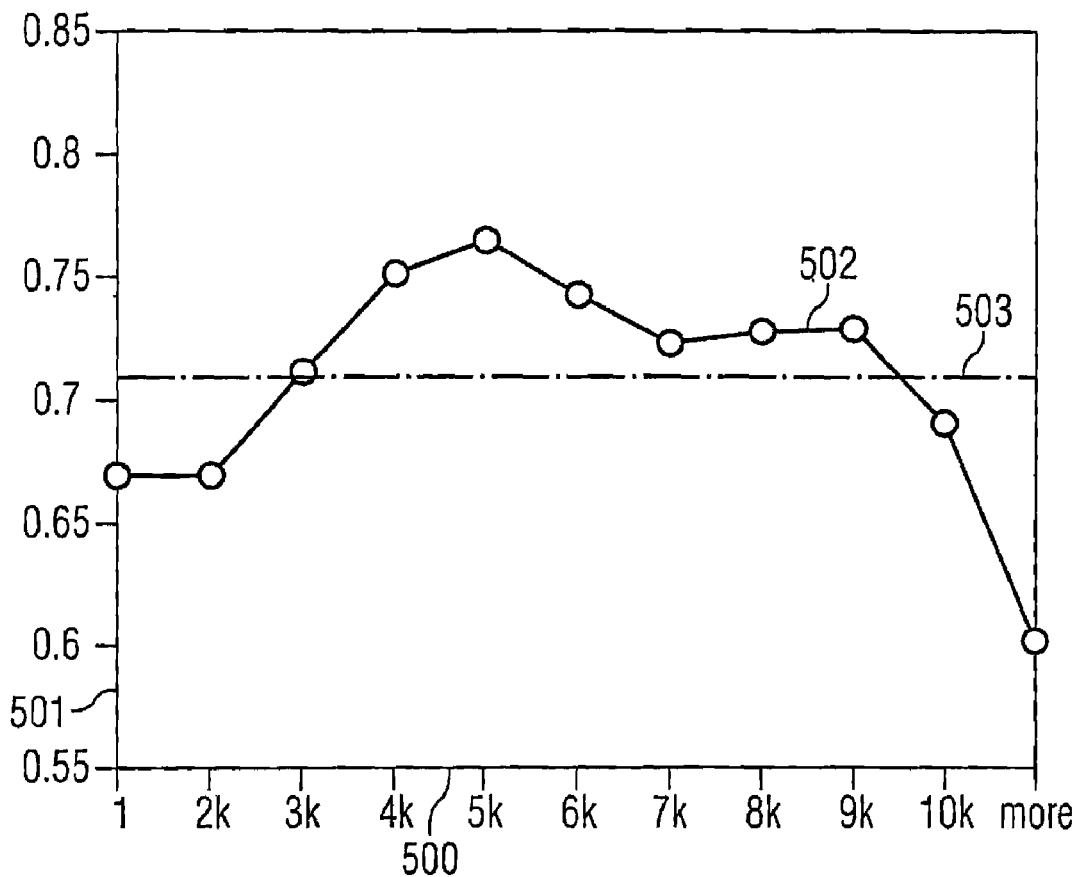

AUTOMATED COMPUTATION OF SEMANTIC SIMILARITY OF PAIRS OF NAMED ENTITY PHRASES USING ELECTRONIC DOCUMENT CORPORA AS BACKGROUND KNOWLEDGE

CROSS REFERENCE TO RELATED APPLICATIONS

This application is based on and hereby claims priority to European Application No. 08014457 filed on Aug. 13, 2008, the contents of which are hereby incorporated by reference.

BACKGROUND

The present disclosure relates to a method and an apparatus, which calculates a semantic similarity between pairs of named entities. Often an a-priori defined text corpus holding named entities is available, wherein a similarity between pairs of named entities can be obtained.

This disclosure further relates to computational linguistics and data mining, but other application domains such as portfolio management, maintenance and creation of dictionaries, text classification, clustering, business development related issues such as identification of synergies between technologies and merging of related divisions and furthermore product portfolio diversification can be contemplated. In order to be able to adopt a more competitive market position and allow for significant cost savings, there is an increasing interest in consolidating technologies across divisions and in exploiting existing synergies that have not been discovered before. At an integrated technology company, for example, the evaluation of synergies is traditionally done in a manual evaluation process by various technical domain experts. The accomplishment of the introduced task by domain experts implies highly labor intense processes. Next to being expensive in terms of resources, the overall duration for completing respective reports is very high.

Some known solutions regarding the analysis of text corpora rely on stop-word-removal and stemming algorithms, which both have an impact on the results of a text corpus analysis. As both concepts are characterized by a high natural language-dependency, applicability of different variants, which may be provided by proprietary or open source organizations, a selection and an application of the concepts requires well-grounded expert knowledge.

Known solutions may lack reliability because of a usage of a single classifier for evaluating a semantic similarity between terms. Furthermore several application domains require a consideration of compositions of terms, such as calculation of synergies of technologies. Some approaches accept only a single term input.

Known approaches do not address an automatic recommendation of technological synergies per se. A leveraging of technological synergies may be intrinsically connected to the notion of semantic similarity. There exist, for example, logics-based approaches for deriving semantic similarity from the domain of description logics, which are formalisms used to describe concepts and their characteristic features. Then one needs to formalize concisely all knowledge used throughout the decision process. This can offset the advantage of a machine-supported synergy detection.

Other known concepts are inspired by statistics and probabilistic reasoning. Then the semantic distance of word meanings is determined rather than considering generic concepts. These approaches mostly rely on electronically available, hierarchically structured dictionaries, such as the popular WordNet (wordnet.princeton.edu/). The problem of similarity matching is here reduced to graph traversal tasks, as well as finding least common subsumers in taxonomy trees. Information-theoretic approaches are also proposed in the state of the art. These approaches mostly apply to concepts found in dictionaries and not to arbitrarily named entities e.g., the expression "Hydraulic Permeability".

With a increasing importance of the Web, corpora-centered approaches have gained momentum: one can compute a semantic similarity between two given words or named entities using massive document collections and employing language statistics, such as point-wise mutual information, word collocation or occurrence correlation, in order to estimate their semantic similarity.

SUMMARY

A method for automatically providing on overall semantic similarity score value among a plurality of named entities is disclosed. For at least a selection of pairs of named entities, for each pair a pair similarity score value is calculated according to a classifier using an electronic information source. For each of the pairs of the selection of pairs of named entities, a further pair similarity score value is calculated according to a further classifier using an electronic information source. For each of the pairs of the selection of named entities the respective overall semantic similarity score value is calculated as a function of the respective pair similarity score value and the respective further pair similarity score value.

Further an apparatus for automatic provision of an overall semantic similarity score value among a plurality of named entities is disclosed. The apparatus includes a first calculation device arranged to calculate, for at least a selection of pairs of named entities, for each pair a pair similarity score value according to a classifier using an electronic information source. The apparatus further includes a second calculation device arranged to calculate, for each of the pairs of the selection of pairs of named entities, a further pair similarity score value according to a further classifier using an electronic information source. The apparatus further includes a third device arranged to calculate, for each of the pairs of the selection of named entities the respective overall semantic similarity score value as a function of the respective pair similarity score value and the respective further pair similarity score value.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 4 is a graph of inter- and intra-sector synergy averages;

FIG. 5 is a table of averaged consensus score values over all pairs of named entities;

DETAILED DESCRIPTION OF EXEMPLARY EMBODIMENTS

Figure 1:
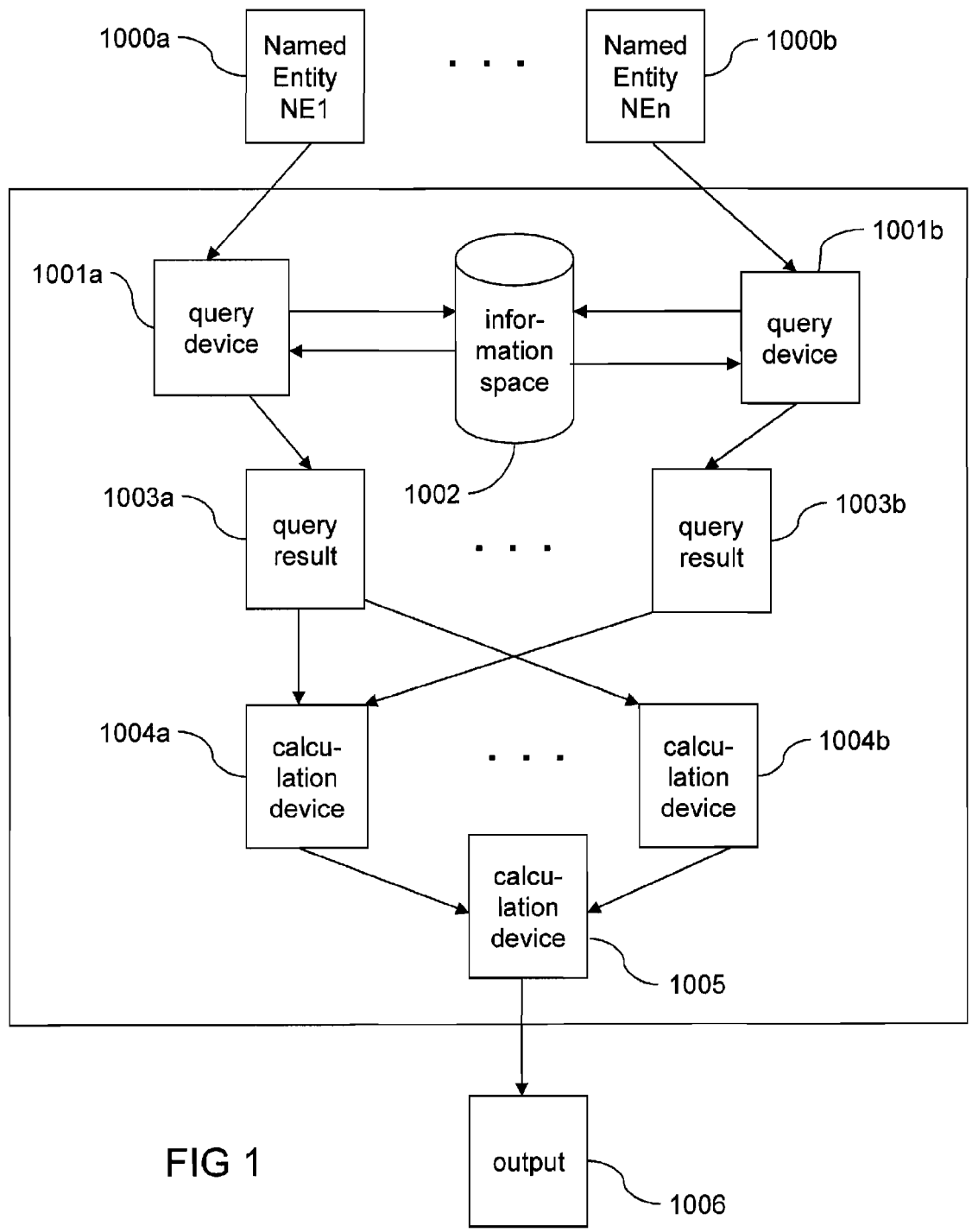
FIG. 1 is a block diagram of a first embodiment of an apparatus for automatic calculation of a semantic similarity between pairs of named entities.

Reference will now be made in detail to exemplary embodiments, examples of which are illustrated in the accompanying drawings, wherein like reference numerals refer to like elements throughout.

In the following certain aspects and embodiments of a method and an apparatus for calculating a semantic similarity between pairs of named entities NE1 and NEn are explicated with reference to the attached drawings. Named entities can be, for example, terms, expressions, strings, characters, punctuation marks, special characters or compositions of each of them. An entity is generally any contrivable real world concept. A number of named entities may be obtained from a text corpus forming, for example, an ordered or unordered list of named entities, a technology list, a natural language text, a description, a specification, an article, a set of data sets, a phrase or a document.

The disclosed aspects are applicable for automatically identifying synergies between related divisions or related sectors of organizations as a function of applied technologies. An organization may include a number of sectors or divisions. Sectors may include a number of divisions. Each division may apply a number of technologies, which are described in one technology list for each division. A synergy may be calculated as a function of a common application of similar technologies across at least two divisions. A synergy may further be calculated as a function of a common application of similar technologies across at least two sectors. For example, comparing named entities representing technologies such as "photovoltaic power" and "wind power" results in a high similarity of technologies.

One can also employ commonly accepted standards in information retrieval in large scale information spaces to obtain reliable results. Classifiers may be used according to certain aspects of the method. A classifier is an indicator for similarity of a pair of named entities according to a predetermined method. Each classifier operates in a different fashion and reflects different aspects of what makes two named entities appear to be similar. Classifiers can be selected based on the expected semantics of the similarity; for example, a similarity with respect to encyclopedic aspects or taxonomic aspects may be contemplated.

FIG. 1 shows a block diagram of a first embodiment of an apparatus 10000 for automatic calculation of a semantic similarity between pairs of named entities from a given text corpus. A given text corpus holds, for example, named entities NE1 . . . NEn, which are denoted by reference signs 1000a and 1000b, respectively. Arrows used in the block diagram indicate a data flow.

First, a classifier for identifying a similarity between pairs of named entities NE1 and NEn is chosen. The classifier relies on a query result from an information space 1002, for example the internet. The information space provides at least one electronic information source. A query result is calculated by the electronic information source and provides named entities related to the submitted named entity. An electronic information source can include an encyclopedia, a search-engine or a further unordered set of named entities. The named entities NE1 and NEn are submitted to the respective electronic information source through a query device 1001a and 1001b, respectively. Submitting includes passing or delivering any contrivable named entity according to any contrivable method. The electronic information source outputs a query result 1003a and 1003b. A query or a query result may be a named entity. Furthermore the query result can include links to related resources, a set of related named entities or a shortest path leading to the position of the input named entity in a tree structure. A person skilled in the art would contemplate other reasonable query results, such as a web page, a document, a data file or a textual word having at least one character.

The extent of the query result can be limited by providing a respective threshold. For example the first m links (for example the value m=1000) of a query result of a search engine can serve as a threshold. The threshold hence defines the upper bound with respect to the amount of the respective query result.

For example, the query result may include pointers to related resources in a hierarchically organized information space (for example, a tree structure or a folder hierarchy). One example for a hierarchically organized information space is the Open Directory Project (ODP) or Google Directory (www.google.com/dirhp).

A first query result 1003a corresponding to the first named entity NE1 is denoted L1, while a second query result 1003b of the second named entity NEn is denoted Ln. The semantic similarity of the two named entities can be calculated as a function of an intersection of L1 and Ln divided by the union of L1 and Ln.

$$sim_{pair} := \frac{|L1 \cap Ln|}{|L1 \cup Ln|}$$

This equation refers to the pair similarity score $sim_{pair}$ of the pair of named entities NE1 and NEn, wherein the query result corresponding to the entity NE1 is denoted L1, and a second query result corresponding to the second named entity NEn is denoted Ln.

The intersection of two given query results, for example L1={ne1, ne2, ne3} and for example Ln={ne1, ne2, ne4} is defined as the set of common entities L1∩L2={ne1, ne2}. The union of two given query results, for example L1={ne1, ne2, ne3} and for example Ln={ne1, ne2, ne4} is defined as the set of the entireness of entities L1∪L2={ne1, ne2, ne3, ne4}.

The pair similarity score value $\text{sim}_{pair}$ is calculated by a first calculation device 1004a arranged to calculate a pair similarity score value for the named entities 1000a and 1000b, according to a first classifier. The pair similarity score value $\text{sim}_{pair}$ may further be calculated by a second calculation device 1004b arranged to calculate the pair similarity score value according to a further classifier. For example, a respective calculation device 10004a calculates all combinations of pair similarity score values involving NE1.

Optionally, a communality of the pair of the named entities NE1 and NEn can be calculated by the intersection of L1 and Ln. The communality explicates the common parts of the query results of the pair of named entities NE1 and NEn. The communality may hence reveal aspects according to which aspects of named entities NE1 and NEn are similar.

As the pair similarity score $\text{sim}_{pair}()$ and communality com( ) defines a symmetric relation $\text{sim}_{pair}(NE1; NE2) = \text{sim}_{pair}(NE2; NE1)$ and
com(NE1; NE2)=com(NE 2; NE1)

the calculation of the pair similarity score $\text{sim}_{pair}()$ and communality com( ) can be accomplished once for each unordered pair of named entities for efficiency reasons. By calculating the communality, the synergies of a pair of named entities can be explicitly stated.

While all classifiers may output pair similarity score values having a range of 0 to 1, the distribution of the pair similarity score values may still vary. A heterogeneous distribution of the pair similarity score values is demonstrated in FIG. 2.

Figure 2:
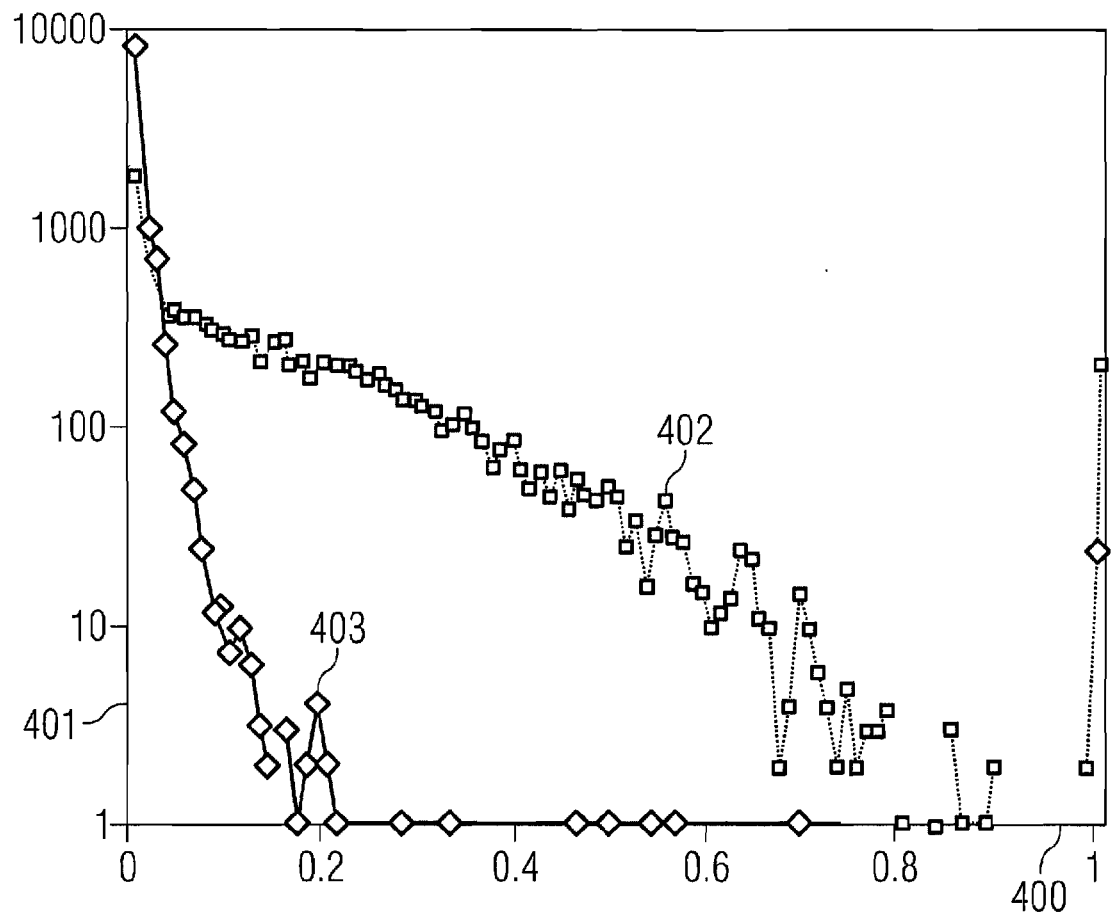
FIG. 2 is a graph of an example of a distribution of pair similarity score values of two classifiers.

FIG. 2 shows an example of a distribution of the pair similarity score values, each distribution 402 and 403 for one of two classifiers. Characteristic for pair similarity score values is a heterogeneous distribution as a function of the respective classifier. Therefore the x-axis 400 shows the pair similarity score values and the number of their occurrence along the y-axis 401.

For example for one classifier a pair similarity score value greater 0.9 may be an exception, while for another classifier that value may represent the common case. One can complement the calculation of pair similarity score values by applying a distribution normalization. Therefore, for example, for each classifier and each named entity a rank list can be calculated, holding each pair of named entities of the underlying text corpus. The rank of each pair of named entities can be determined by arranging pair similarity score values in a descending order.

Figure 3:
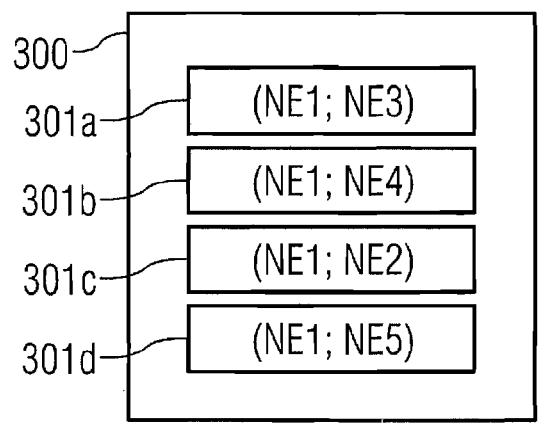
FIG. 3 is a block diagram illustrating an example of a rank list.

An example of a rank list is illustrated in FIG. 3. A rank list 300 can be calculated for each of the named entities for normalizing the distribution of similarities. A rank list can be calculated, for example, for each named entity per classifier. The shown list 300 is assigned to NE1. Consequently named entity NE1 is the named rank list holder. For each rank list holder a respective rank list is calculated corresponding to the respective pairs, for example, 301a, 301b, 301c and 301d of named entities of the text corpus. In the present example, the respective other named entities from the text corpus are the entities NE2, NE3, NE4 and NE5. The rank list is ordered as a function of the similarity of each named entity with respect to the rank list holder NE1. The rank of a pair of named entities corresponds to a position in the rank list 300.

The rank list can, for example, also include at least a selection of all pairs of named entities per classifier.

For example, in case the pair similarity score value of named entities NE1="solar power", NE2="wind", NE3="nano tech", NE4="desalination" and NE5="solar" have calculated values as follows:

simpair(solar power; wind)=0.7
simpair(nano tech; solar power)=0.1
simpair(desalination; solar)=0.3
. . .

the corresponding rank list is
solar power; wind
desalination; solar
nano tech; solar power
. . .

wherein the pair of named entities (solar power; wind) holds rank 1, the pair of named entities (desalination; solar) holds rank 2 and the pair of named entities (nano tech; solar power) holds rank 3.

The normalized pair similarity score values are formed as a function of the respective rank of each pair of named entities NE1 and NEn in the rank list. The normalized pair similarity score value for a pair of named entities NE1 and NEn is, for example, the rank of the pair within the rank list. Aspects of underlying methods for creating the rank lists are explained in more detail below.

In a third calculation device 1005, the arithmetic mean value of the normalized pair similarity score values for each pair of named entities NE1 and NEn for each classifier is calculated. Hence, the output values of each classifier, namely the normalized pair similarity score values, are consolidated into one overall semantic similarity score value for each pair of named entities NE1 and NEn by calculation device 1005.

In addition to providing a numerical value of a similarity as the overall semantic similarity score value, a communality of each pair of named entities NE1 and NEn as an extension of the pair similarity score value can be calculated. The communality of a pair of named entities is defined as the intersection of the respective query results L1 and Ln. Hence further information about the similarity of the pair of named entities NE1 and NEn is obtained.

The output 1006 of the apparatus 10000 for automatic calculation of a semantic similarity between pairs of named entities includes an overall semantic similarity score value and a communality of each pair of named entities.

In a variation of the apparatus 10000 a classifier based on a further unordered set of named entities can be used. Hence, an alternative implementation of the calculation devices referenced by signs 1003a, 1004a and signs 1003b, 1004b respectively can be contemplated. Calculating the semantic similarity of technologies from the field of, for example, "data mining" may be performed based on a further unordered set of named entities, which holds all named entities that are used in the field of "data mining". The alternative implementation may include the following.

The operation of a classifier includes submitting each named entity to an electronic information data source 1002. Each obtained query result 1003a and 1003b may include a document or a set of documents. In case the electronic information data source is a search engine, the query result includes a list of links that lead to further text corpora being used by further calculation devices. The occurrence of each named entity of the further text corpus in the document or in the respective set of documents obtained through the query result is indicated by one vector per named entity. One can impose as a constraint that all vectors are of the same dimension.

A first calculation device arranged to calculate the pair similarity score value 1004a compares pairwise vectors for calculating a pair similarity score value of named entities 1000a and 1000b according to a first classifier. Furthermore, a number of further calculation devices 1004b arranged to calculate the pair similarity score values calculate the pair similarity score values according to the number of further classifiers. Comparing the vectors for each of the vectors' components may involve calculating a cosine similarity measure or statistical correlation coefficients such as Pearson coefficient or Spearman coefficients. The result of the calculation of the pair similarity score value of the vectors is a numerical value in the range of 0 to 1.

In a further example, divisions denoted by D which are assigned to sectors denoted by S of an organization are compared for identifying a synergy by respective technology lists denoted by T. Each technology is denoted by one named entity. A sample technology list for three sectors (industry, energy and health-care) is shown in the following table:

| Technology | Sector | Division |
|---|---|---|
| computed tomography | health-care | Div A |
| flue gas | energy | Div C |
| membrane bio reactor | industry | Div B |
| ... | ... | ... |

A complete technology list, for example, for 15 divisions and 10 representative technologies has a number of pairs of named entities $$|\{NEi, NEj\} \in T \times T | i \neq j\}| = \frac{150 \times 149}{2} = 11,175$$

assuming that each technology, respectively named entity, occurs once in the entireness of the technology lists. For the calculation of the pair similarity score value, for example, a classifier Cw using Wikipedia as an electronic information data source and a classifier Cd using dmoz as an electronic information data source, is applied.

The pair similarity score values may be distributed as shown in FIG. 2. For normalizing the distribution two ranking maps Rw:T×T→N and Rd defined accordingly are used, wherein N is the set of natural numbers. For calculating a final rank an arithmetic mean of both ranking maps Rw and Rd can be calculated as follows $$sim_{overall}(NEi, NEj) = \frac{Rw(\{NEi, NEj\}) + Rd(\{NEi, NEj\})}{2}$$

In order to verify whether the two classifiers reach a consensus regarding the rank of entries, a consensus metric c:T× T→[0,1] can be calculated:

$$c(NEi, NEj) = \frac{|Rw(\{NEi, NEj\}) - Rd(\{NEi - NEj\})|}{|T| \times (|T| - 1) \times 0.5}$$

In case Cw and Cd assign the same rank, function c( ) returns 1, attesting 100% consensus. In case Cw and Cd dissent maximally, the result is 0. FIG. 4 shows averaged consensus score values over all pairs of the present example. FIG. 4 shows averaged consensus score values over all pairs of named entities. The x-axis 500 denotes the range of ranks and the y-axis denotes the consensus in percent. Curve 502 describes an example of a consensus score value and curve 503 describes examples of an average consensus score value. For example, within a complete technology list holding 11,175 pairs of named entities, the consensus score value is highest for pairs of named entities ranked at positions 4,000 to 6,000.

An application of aspects of the present embodiment is an identification of synergies. Therefore technology lists are compared with each other, by comparing pairs of technologies denoted by NEi and NEj. Therefore a Pivot tabulation is calculated, which may hold the following layers. A first layer for the overall semantic similarity score value of each pair of named entities, a second layer for the average semantic similarity score value of each pair of named entities per division and a third layer for the average overall semantic similarity score value per sector. A Pivot tabulation may hold sorted, counted or totaled pairs of named entities.

FIG. 5 shows inter- and intra-sector synergy averages according to the present example. The following table shows averages of inter- and intra-division overall semantic similarity scores:

| Sector | Intra-Division | Inter-Division |
|---|---|---|
| industry | 62.66 | 59.71 |
| energy | 64.70 | 63.32 |
| health-care | 54.75 | 28.45 |

FIG. 5 shows inter- and intra-sector synergy averages according to an example illustrating aspects of an embodiment. For identifying of synergies technology lists are compared with each other, by comparing pairs of technologies NEi and NEj. The diagram shows an average synergy potential for all combinations of sectors, likewise having of inter- and intra-sector overall semantic similarity score values. The pair of sectors holding the highest average synergy score for one given sector is marked with one of three characters, wherein I denotes the industry sector, E denotes the energy sector and H denotes the health sector.

As an example, the following devices can be implemented as a respective calculation device: a microprocessor, a processor, a computer, a computer system, a central processing unit, an arithmetic processing unit or a circuit.

Figure 6:
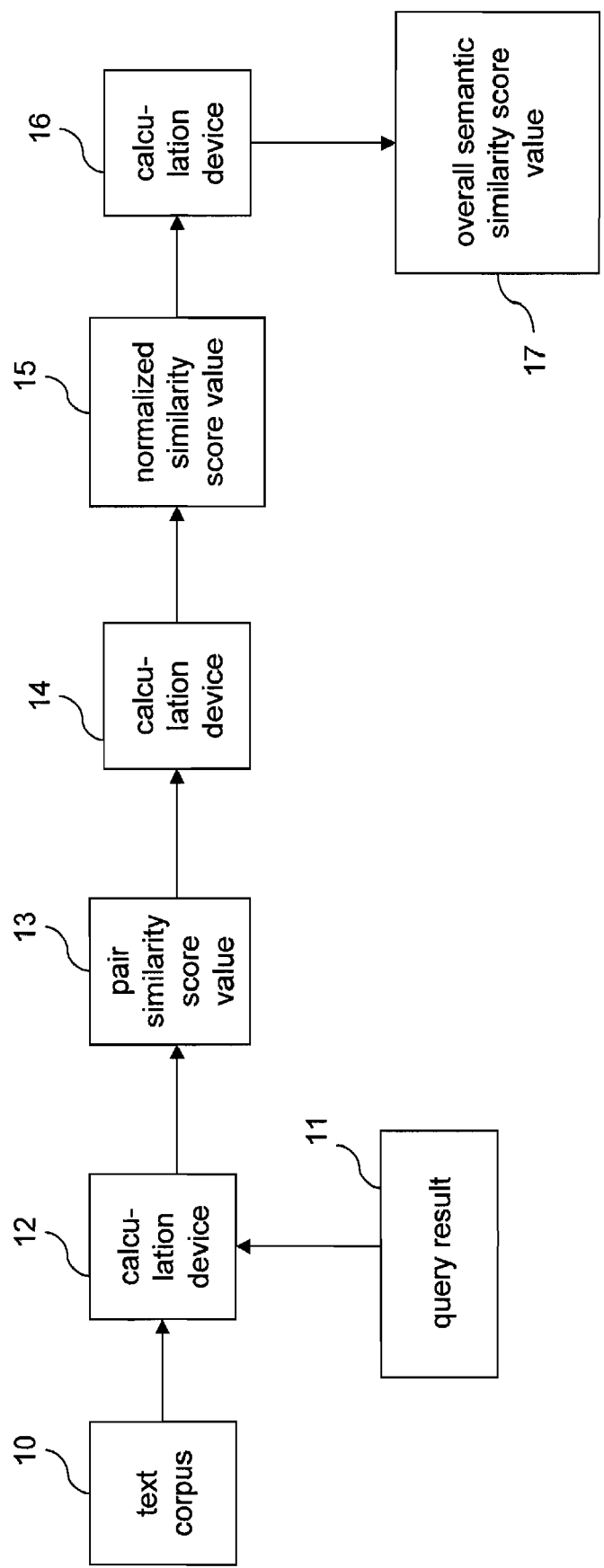
FIG. 6 is a block diagram of a second embodiment of an apparatus for automatic calculation of a semantic similarity between pairs of named entities.

FIG. 6 shows a block diagram of an apparatus for automatic calculation of the semantic similarity between pairs of named entities NE1 and NE2 according to a second embodiment. A data flow involving a text corpus 10 includes the named entities and serves as input for a first calculation device 12. As a function of a respective classifier a pair similarity score value of each pair of named entities NE1 and NE2 is calculated as a function of an obtained query result 11. The obtained pair similarity score value 13 is further submitted to a second calculation device 14 for calculating a normalization of the pair similarity score value. Calculation device 14 may calculate for each named entity a rank list per classifier holding each pair of named entities in a descending order according to the pair similarity score value, as for example illustrated in FIG. 3. Further a normalized similarity score value 15 can be calculated as a function of the rank of each pair of named entities NE1 and NE2 per classifier. The normalized pair similarity score values 15 are submitted to a third calculation device 16 for calculating an arithmetic mean value of the normalized pair similarity score values. The arithmetic mean value of the normalized pair similarity score value per classifier represents the overall semantic similarity score value 17 of the pair of named entities NE1 and NE2.

Figure 7:
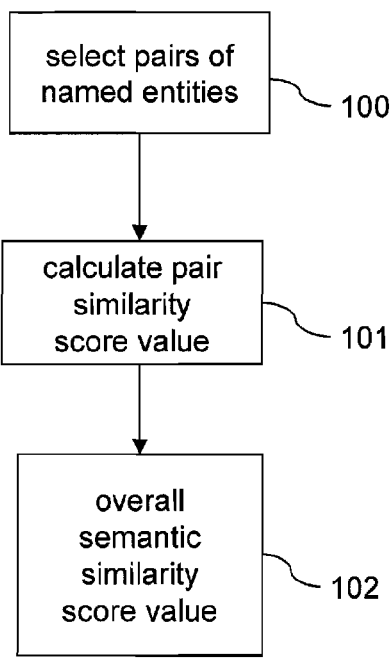
FIG. 7 is a flowchart illustrating a method for automatic calculation of a semantic similarity between pairs of named entities, used by the apparatus according to the second embodiment.

FIG. 7 shows a flowchart illustrating a method for calculating a semantic similarity between pairs of named entities, used in the apparatus according to the second embodiment, as shown in FIG. 6, and includes the following operations.

For at least a selection of pairs of named entities, for each pair a pair similarity score value is calculated 100 according to a classifier using an electronic information source. For each of the pairs of the selection of pairs of named entities, a further pair similarity score value is calculated 101 according to a further classifier using an electronic information source. For each of the pairs of the selection of named entities the respective overall semantic similarity score value is calculated 102 as a function of the respective pair similarity score value and the respective further pair similarity score value.

Figure 8:
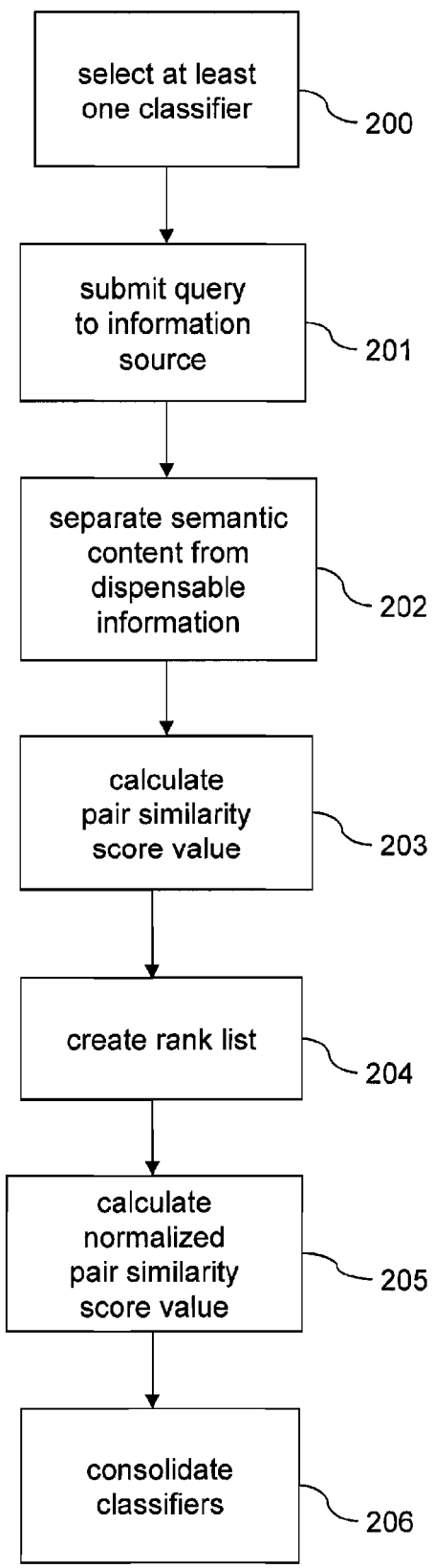
FIG. 8 is a flowchart illustrating the method for automatic calculation of a semantic similarity between pairs of named entities, used by the apparatus according to the second embodiment.

FIG. 8 shows a detailed flowchart illustrating the method for calculating a semantic similarity between pairs of named entities, e.g. used in the apparatus according to the second embodiment. For calculation of a pair similarity score value, at least one classifier is selected 200. Each classifier is based on an electronic information source, which can be an encyclopedia, a search engine or a further unordered set of named entities.

Next the query is submitted 201 to the respective information source, then information holding semantic content is separated 202 from dispensable information. Information holding semantic content is related to the submitted named entity and may include links, keywords or entities of a path or the path itself, which depends on the respective classifier. Dispensable information is not related to the submitted named entity and may include mark-up for instance. Characteristics of dispensable information can be stored in a list, which is created by probing and analyzing sample query results. The information holding semantic content is regarded as the query result.

As a function of the query result, the pair similarity score value of the pairs of named entities NE1 and NE2 is calculated 203. Further, a rank list can be calculated for each named entity per classifier. This named entity is denoted "rank list holder" in the following. For example, for each rank list holder a respective rank list can be calculated, the rank list holding each pair of named entities from the text corpus. The entries in the rank list are ordered as a function of the similarity of each named entity with the rank list holder. Creating the rank list is performed 204. An example of a rank list is illustrated in FIG. 3.

For normalizing a heterogeneous distribution of the pair similarity score values over the value range of the pair similarity score values, the normalized pair similarity score values are calculated 205. The normalized pair similarity score value is calculated as a function of the rank of similarity of the pairs of named entities NE1 and NE2.

For consolidating classifiers 206, the arithmetic mean of the normalized pair similarity score values of respectively each pair of named entities NE1 and NE2 can be calculated.

In the following aspects of an example for providing on overall semantic similarity score value for a pair of named entities NE1 and NE2 is demonstrated referring to the operations illustrated in FIG. 8. A text corpus containing the entities NE1, NE2, NE3 and NE4 is assumed to be available. Three classifiers Cg, Cw and Cy are selected 200. After submitting 201 a query and obtaining a query result, the following pair similarity score values may, for example, be calculated 202:

Cg: $sim_{pair}(NE1; NE2)=0.7$
Cw: $sim_{pair}(NE1; NE2)=0.3$
Cy: $sim_{pair}(NE1; NE2)=0.1$
Cg: $sim_{pair}(NE1; NE3)=0.6$
Cw: $sim_{pair}(NE1; NE3)=0.4$
Cy: $sim_{pair}(NE1; NE3)=0.5$
Cg: $sim_{pair}(NE1; NE4)=0.03$
Cw: $sim_{pair}(NE1; NE4)=0.02$
Cy: $sim_{pair}(NE1; NE4)=0.01$ The pairs of named entities are ranked 204 along each classifier. Hence for each classifier and each named entity a rank list is calculated, having as entries the pairs of named entities. An example of a rank list for classifier Cg and named entity NE1 is shown in the following:

(NE1; NE2)
(NE1; NE3)
(NE1; NE4).

An example of a rank list for classifier Cw and named entity NE1 is shown in the following:

(NE1; NE3)
(NE1; NE2)
(NE1; NE4).

An example of a rank list for classifier Cy and named entity NE1 is shown in the following:

(NE1; NE3)
(NE1; NE2)
(NE1; NE4).

The normalized pair similarity score value is calculated 205 as a function of the rank. As an example the normalized pair similarity score value can be chosen to be equal to the rank. This is demonstrated in the following:

Cg: (NE1; NE2)=1
Cw: (NE1; NE2)=2
Cy: (NE1; NE2)=2

The consolidation of classifiers can, for example, be calculated 206 by the following equation, $$sim_{overall}(NEx; NEy) = 1 - \frac{\sum_{z}^{|C|} rank_z(NEx; NEy)}{|T-1|*|C|},$$

wherein each obtained rank of NEx and NEy, for each classifier, calculated by $rank_z(NEx; NEy)$ is summed up and divided by the number of all ranks, which may be a cardinality of the text corpus minus the rank list holder $|T-1|$, the dominator is multiplied by the number of used classifiers $|C|$.

$$sim_{overall}(NE1; NE2) = 1 - \frac{1+2+2}{3*3} = 1 - \frac{5}{9} = \frac{4}{9} \approx 0.44$$

Hence the overall semantic similarity in the present example for NE1 and NE2 is approximately 0.44.

Figure 9:
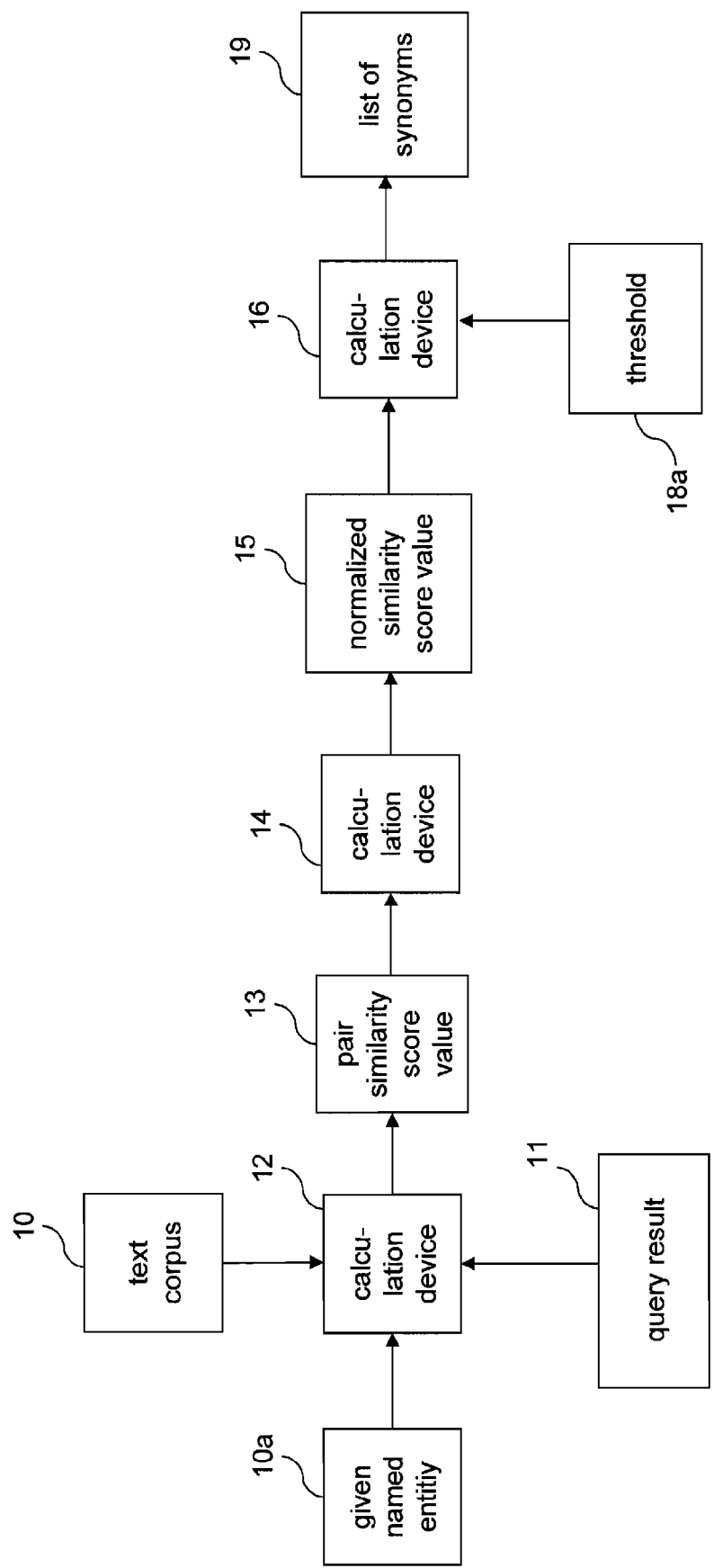
FIG. 9 is a block diagram of a third embodiment of an apparatus for automatic calculation of a semantic similarity between pairs of named entities.

FIG. 9 shows a third embodiment of an apparatus for automatic calculation of the semantic similarity between pairs of named entities NE1 and NE2. Only the most significant differences with respect to FIG. 6 are elaborated.

The application domain of this embodiment is the calculation of synonyms for a given named entity. A synonym is calculated for a first named entity and a second named entity, wherein the overall semantic similarity score value of the pair of named entities is greater than a predetermined threshold.

The threshold provides the minimum overall semantic similarity score value for the pair of named entities for which such a synonym relation holds. The pair similarity score value is calculated based on a data flow representing the text corpus 10, the obtained query result 11 and a given named entity 10*a*, for which a synonym or a list of synonyms respectively has to be calculated. After calculating the overall semantic similarity score value 17 a threshold 18*a* is provided, which corresponds to a minimum similarity of pairs of named entities NE1 and NE2, for which a synonym relation holds. All pairs of named entities NE1 and NE2 for which the synonym relation holds are included in a list of synonyms 19.

Figure 10:
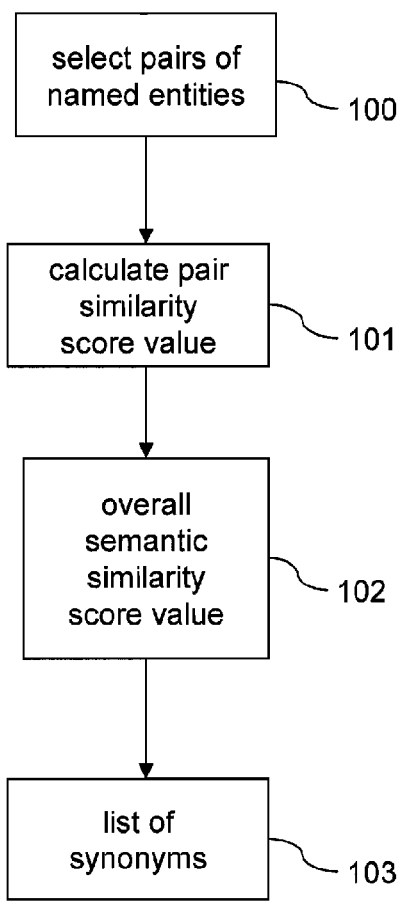
FIG. 10 is a flowchart illustrating a method for automatic calculation of a semantic similarity between pairs of named entities, used by the apparatus according to the third embodiment.

FIG. 10 shows a flowchart illustrating a method for automatic calculation of a semantic similarity between pairs of named entities, used in the apparatus according to the third embodiment.

After providing 102 the overall semantic similarity score value for each pair of named entities NE1 and NE2, a list of synonyms is calculated 103 based on the given threshold.

Figure 11:
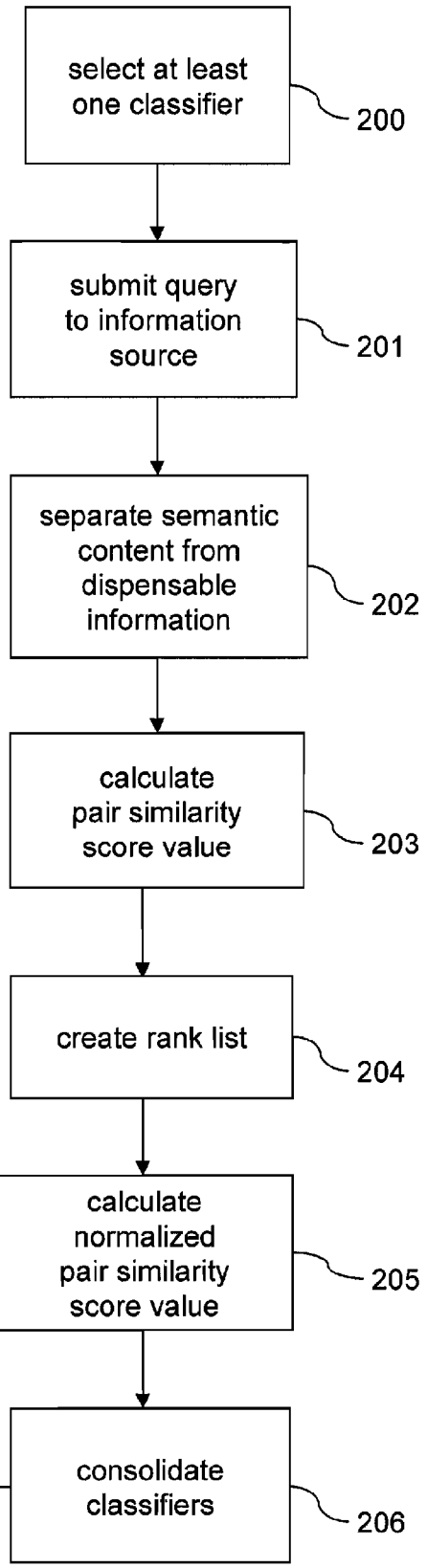
FIG. 11 is a detailed flowchart illustrating the method for automatic calculation of a semantic similarity between pairs of named entities, used by the apparatus according to the third embodiment.

FIG. 11 shows a detailed flowchart illustrating a method for automatic calculation of a semantic similarity between pairs of named entities. Differences with respect to FIG. 8 are elaborated here.

Submitting 201 a query is accomplished based on a given named entity and the respective other named entities from the text corpus. After calculation of the overall semantic similarity score value, a list of synonyms is calculated 207 as a function of a threshold, which states a minimum overall semantic similarity score value of pairs of named entities NE1 and NE2, for which the synonym relation holds.

Figure 12:
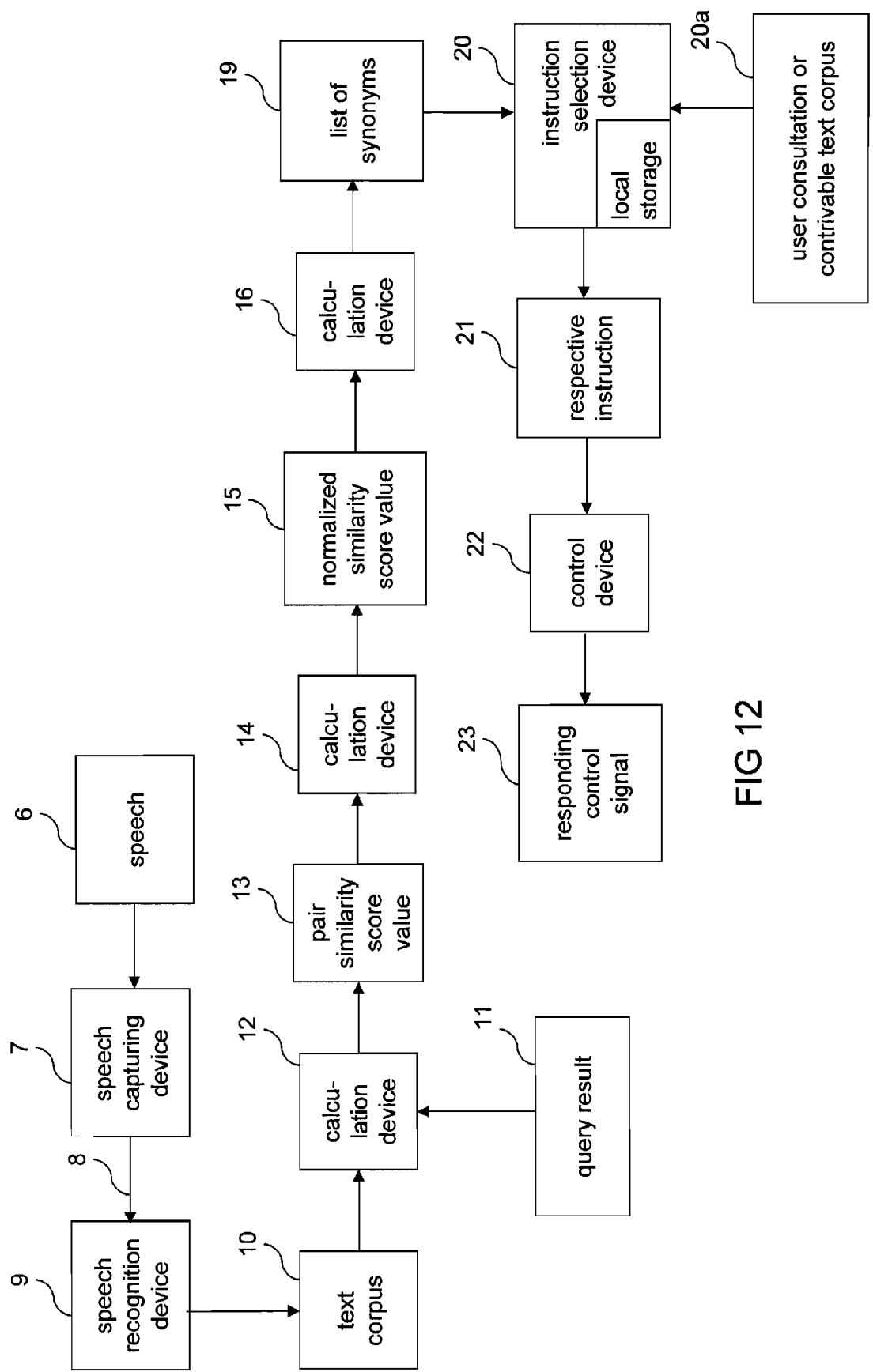
FIG. 12 is a block diagram of a fourth embodiment of an apparatus for automatic calculation of a semantic similarity between pairs of named entities.

FIG. 12 shows a fourth embodiment of an apparatus for automatic calculation of the semantic similarity between pairs of named entities NE1 and NE2 and differs from the embodiment of FIG. 6 as follows.

The application domain of this embodiment is a voice control unit, which may for instance be included in a user interface of a vehicle. Therefore, speech 6 is captured as an audible uttering by a respective speech capturing device 7, which is for instance a microphone. The resulting signal 8 is submitted to a speech recognition device 9. The speech recognition device 9 calculates the text corpus 10. In this embodiment, the query results are preferably received from an offline local electronic information data source or via a mobile data connection. After calculating the overall semantic similarity score value 19, an instruction selection device 20 selects at least one instruction from a local storage 20*s*, optionally as a function of a further input 20*a*, which may be a user consultation or any contrivable text corpus including spoken or written named entities. The respective instruction 21 is submitted to a control device 22, which calculates a responding control signal 23.

Figure 13:
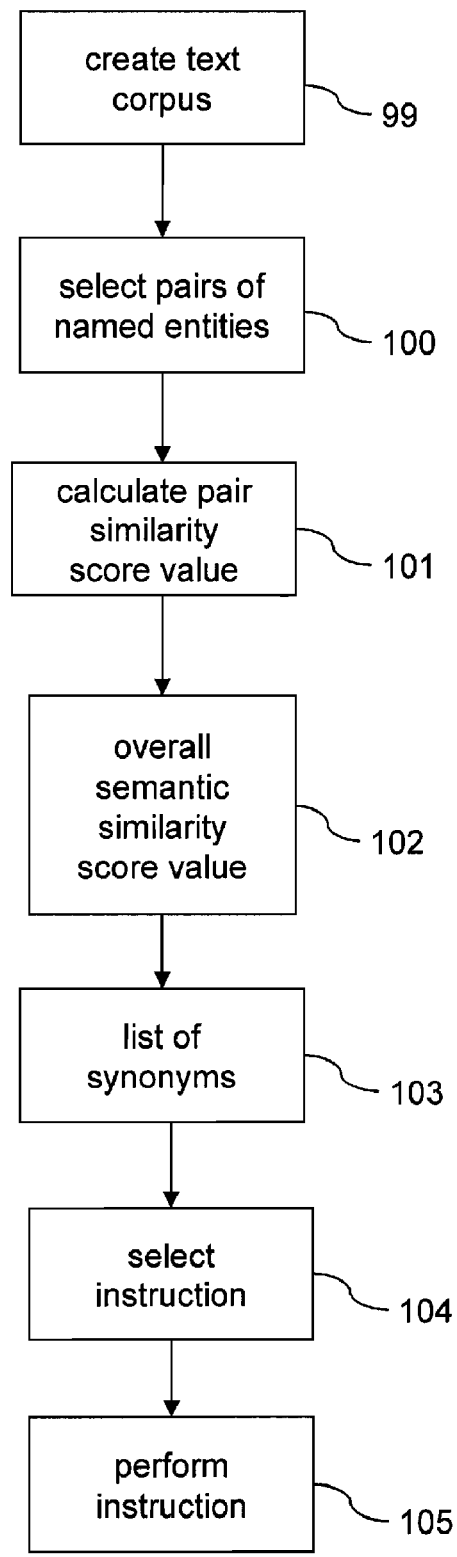
FIG. 13 is a flowchart illustrating a method for automatic calculation of a semantic similarity between pairs of named entities, used by the apparatus according to the fourth embodiment.

FIG. 13 shows a flowchart illustrating a method for automatic calculation of a semantic similarity between pairs of named entities, used in the apparatus according to the fourth embodiment.

The text corpus is created 99 by a speech recognition process, then operations 100-102 as explained in FIG. 7 are performed. After providing 102 the overall semantic similarity score value, a respective instruction is selected 104 and the instruction is performed 105.

Figure 14:
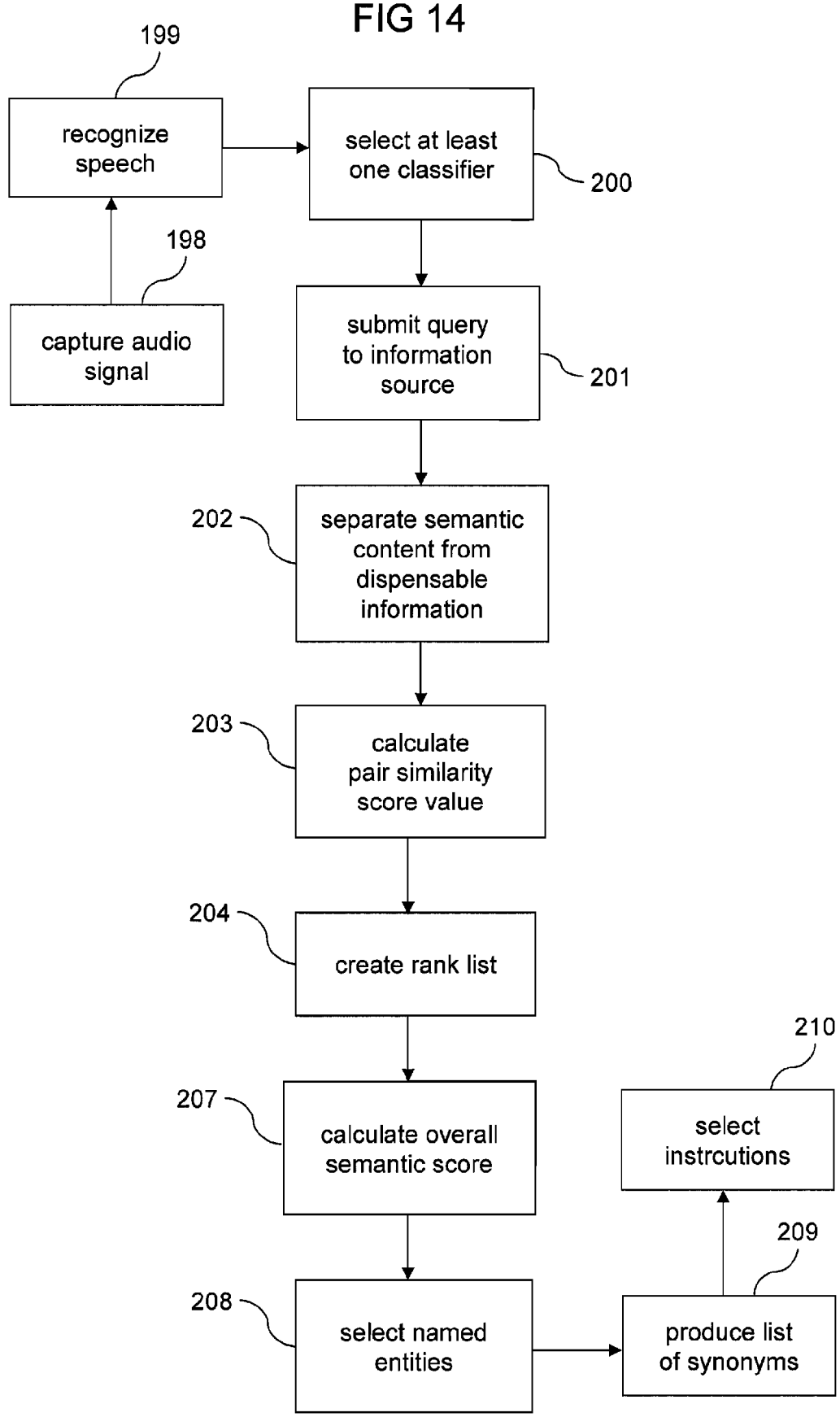
FIG. 14 is a detailed flowchart illustrating the method for automatic calculation of a semantic similarity between pairs of named entities, used by the apparatus according to the fourth embodiment.

FIG. 14 shows a detailed flowchart illustrating a method for automatic calculation of a semantic similarity between pairs of named entities. First, an audio signal is captured 198 and further speech recognition is accomplished 199. In this embodiment the submission of the query is performed only for a selection of named entities. Therefore, as an example, computational linguistics can be applied, for example, stop-word-removal and stemming. Operations 200-204 are the same as explained before. After the overall semantic similarity score value is calculated 207, named entities for which synonyms are considered in the following procedure, are selected 208. This is performed as a function of a further input, which may be an a-priori rule set or a user consultation. The named entities that are identified as synonyms in the present embodiment may be instructions, destinations, trademarks or services. A selection of synonyms are output 209 corresponding to the recorded uttering as a named entity. Based on a further input, a respective instruction can be selected 210.

During the process, the user is provided with alternatives, which are named entities having a synonym relation with the input named entity. If for instance in the application domain of route guidance, a desired "point of interest" is not available at the current position (or within a certain distance), alternatively another destination, which is closely related to the "point of interest", can be presented to the user via an appropriate interface.

Figure 15:
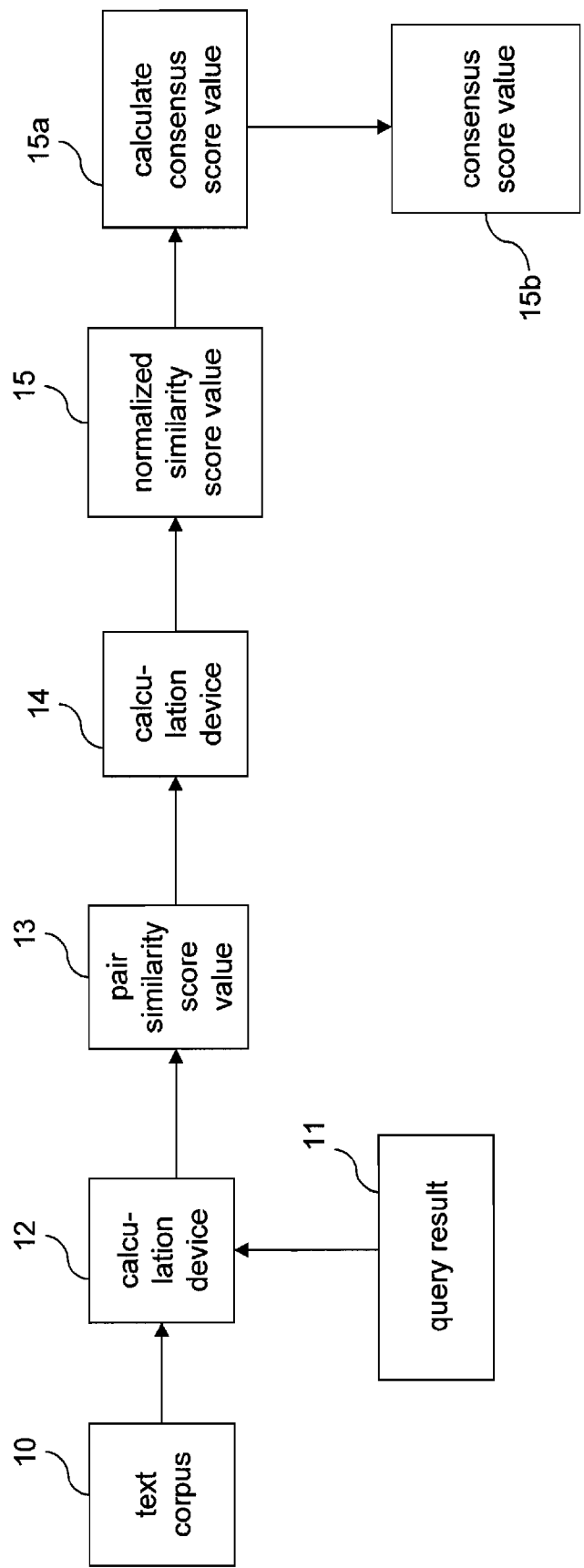
FIG. 15 is a block diagram of a fifth embodiment of an apparatus for automatic calculation of a semantic similarity between pairs of named entities.

FIG. 15 shows a fifth embodiment of an apparatus for automatic calculation of the semantic similarity between pairs of named entities NE1 and NE2. Elements 10-14 correspond to the like elements as explained in FIG. 6.

After calculating the normalized pair similarity score value 15, a consensus score value is calculated 15*b*. Therefore, a device for calculating a consensus score value 15*a* may be employed. Calculating a consensus score value can be performed, for example, by taking the average of the differences of ranks for every pair of named entities per classifier and dividing by the overall number of pairs.

For example, if the similarity of 100 pairs of named entities is to be calculated and two classifiers are used and in a first case the rank of one given pair is 50 for the first classifier and 1 for the second, then the consensus score value is approximately 0.5 as the deviation in the rank is considerable. In a second case if both classifiers are assign rank 50, the consensus score value is 1, which is the maximum consensus score value attainable.

It is to be noted that like or functionally like elements in the figures are not explained redundantly in the text. Rather it is to be understood that those elements perform functions as mentioned with respect to their first occurrence in this disclosure.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to exemplary embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

What is claimed is:

1. A method for automatically providing an overall semantic similarity score value among named entities, comprising:
    calculating, for each pair in at least a selection of pairs of the named entities, a pair semantic similarity score value according to a classifier using at least one electronic information source;

calculating, for each of the pairs in the selection of the pairs of the named entities, a further pair semantic similarity score value according to a further classifier using the at least one electronic information source; and calculating, for each of the pairs in the selection of the pairs of the named entities, an overall semantic similarity score value as a first function of the pair semantic similarity score value and the further pair semantic similarity score value corresponding thereto.

2. The method according to claim 1, further comprising ordering the pairs of the named entities as a second function of the pair semantic similarity score value calculated for each pair to provide a rank list for each classifier.

3. The method of claim 2, wherein said calculating the overall semantic pair similarity score value for a respective pair of the named entities uses an arithmetic mean of ranks of the respective pair of the named entities in rank lists obtained by said ordering.

4. The method according to claim 1, wherein said calculating the further pair semantic similarity score value is repeated for additional classifiers to obtain pair semantic similarity score values which include the pair semantic similarity score value and the further pair semantic similarity score value.

5. The method of claim 4, wherein the overall semantic pair similarity score value is calculated as a second function of the pair semantic similarity score values according to the classifiers for each pair of the named entities.

6. The method according to claim 1, wherein said calculating the pair semantic similarity score value includes submitting a query to the at least one electronic information source and processing a query result from each electronic information source queried.

7. The method according to claim 6, wherein the at least one electronic information source includes at least one of search engines and electronic encyclopedias.

8. The method according to claim 6, wherein query results obtained by submitting the query to the at least one electronic information source include sets of the named entities.

9. The method of claim 6, wherein said submitting the query includes submitting a named entity as a query input to the at least one electronic data information source, and wherein the query result is a set of links to resources, which are semantically related to the named entity.

10. The method according to claim 1, wherein the named entities are organized in a tree structure, and wherein said calculating the pair semantic similarity score value uses a second function of a position of respective named entities in the tree structure.

11. The method according to claim 10, wherein said calculating the pair semantic similarity score value uses a third function of a respective shortest path from a root of the tree structure to a node representing one of the respective named entities.

12. The method according to claim 1, wherein said calculating the pair semantic similarity score value is performed for each pair of the named entities in a text corpus.

13. The method according to claim 1, further comprising calculating a consensus score value as a second function of similarity score values per classifier.

14. The method according to claim 1, further comprising calculating a similarity between a first set of the named entities and at least one second set of the named entities, as a function of a Pivot tabulation which includes sorting, counting and totaling overall semantic similarity score values for a respective set of the named entities.

15. The method according to claim 1, further comprising calculating a communality of at least one pair of the named entities, the communality corresponding to a subset of a set of the named entities, a sub-path or links to resources related to each named entity of a respective pair of the named entities.

16. An apparatus for automatic provision of an overall semantic similarity score value among a plurality of named entities comprising:

a first calculation device calculating, for each pair in at least a selection of pairs of the named entities, a pair semantic similarity score value according to a classifier using an electronic information source;

a second calculation device calculating, for each of the pairs in the selection of pairs of the named entities, a further pair semantic similarity score value according to a further classifier using the electronic information source; and a third calculation device calculating, for each of the pairs in the selection of the named entities an overall semantic similarity score value as a first function of the pair semantic similarity score value and the further pair semantic similarity score value corresponding thereto.

17. The apparatus according to claim 16, wherein the named entities are organized in a tree structure, and wherein said first calculation device calculates the pair semantic similarity score value as a second function of a respective shortest path from a root of the tree structure to a node representing a respective named entity in the tree structure.

18. The apparatus according to claim 16, wherein said second calculation device calculates a consensus score value as a second function of a deviation of the pair semantic similarity score value compared to the pair semantic similarity score value of the further classifier.

19. The apparatus according to claim 16, wherein said first calculation device calculates a communality of at least one pair of the named entities, the communality corresponding to a subset of a set of the named entities, a sub-path or links to resources related to each named entity of a respective pair of the named entities.

20. The apparatus according to claim 16, further comprising a fourth calculation device calculating a similarity between a first set of the named entities and at least one second set of the named entities, as a function of a Pivot tabulation which includes sorting, counting and totaling overall semantic similarity score values for a respective set of the named entities.

21. The apparatus according to claim 16, further comprising at least one identification device identifying a synonym of a named entity from a text corpus, by identifying pairs of the named entities, for which the overall semantic similarity score value exceeds a predetermined threshold.

22. The apparatus according to claim 16, wherein said first calculation device calculates the pair semantic similarity score value for each pair of the named entities.

23. The apparatus according to claim 22, further comprising at least one voice control device performing an operation as a second function of at least one synonym of an audible uttering.

* * * * *